United States Patent Office 3,832,253
Patented Aug. 27, 1974

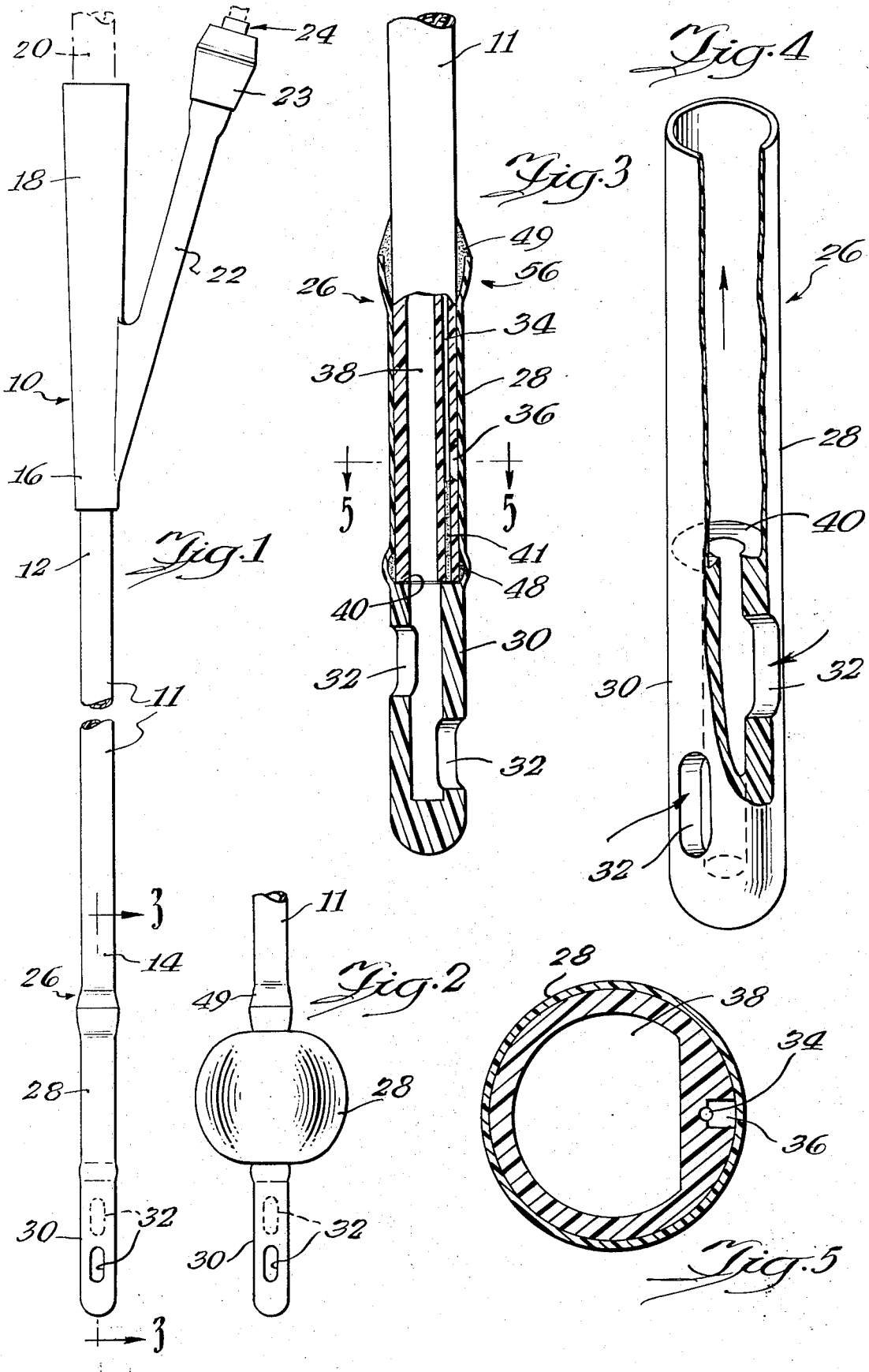

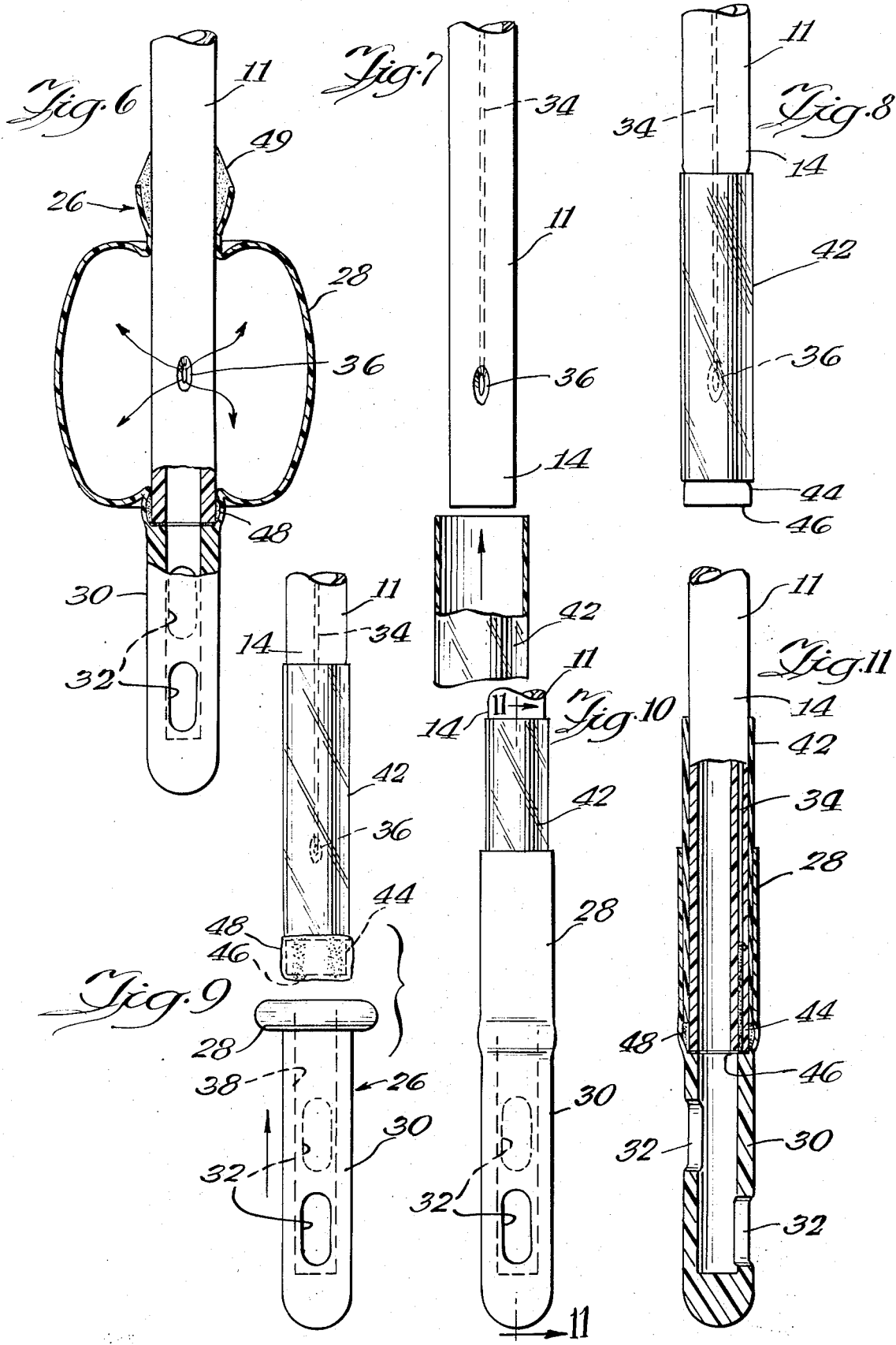

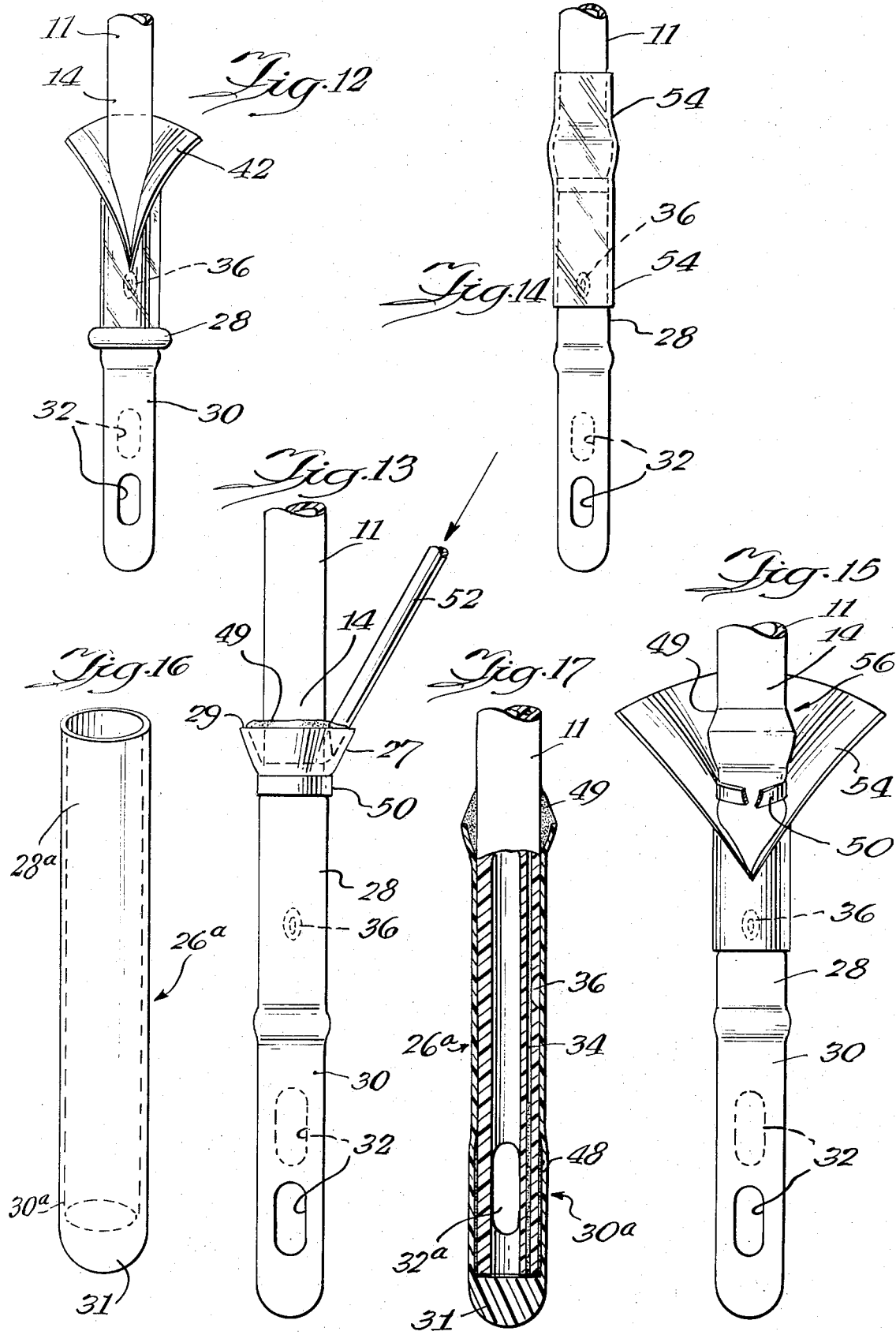

3,832,253
METHOD OF MAKING AN INFLATABLE BALLOON CATHETER
Giorgio Di Palma, Hanover Park, and Henry M. Gajewski, Winnetka, Ill., assignors to Baxter Laboratories, Inc., Morton Grove, Ill.
Filed Mar. 21, 1973, Ser. No. 343,606
Int. Cl. B29c 27/00
U.S. Cl. 156—86    9 Claims

ABSTRACT OF THE DISCLOSURE

A method is disclosed for making an inflatable balloon catheter. The method employs a number of heat shrinkable sleeves and adhesive to attach a catheter tip to a catheter shaft.

BACKGROUND OF THE INVENTION

This invention concerns a method of making inflatable balloon catheters. These catheters are commonly referred to as "Foley catheters." They are characterized by having a flexible, cylindrical shaft having two passageways, channels or lumina extending longitudinally through it. Means for inflating the balloon and draining the catheter are located at the proximal end of the shaft. The inflating and draining means generally take the form of a Y section at the proximal end of the shaft. In each arm of the Y there is a lumen or passageway communicating with one lumen or passageway of the shaft. At the distal end of the shaft is located a catheter tip comprising an inflatable balloon section and a drainage section. One lumen is in communication with an inflating lumen in the catheter shaft. It extends from one arm of the Y to a port in the shaft which is covered by the balloon section of the catheter tip. This port extends through the shaft wall and allows fluids in the inflating lumen to pass into the inflating balloon.

Distally of the inflating balloon are located one or more drainage eyes. These eyes communicate with the drainage lumen or passageway. This lumen extends the length of the shaft and communicates with the other arm of the Y. Attached to this arm of the Y would be means for collecting the material being drained, for example, urine from the bladder.

Catheters of this general type are well known in the art. They are most frequently used to drain urine from the human bladder. In practice, the distal portion of the catheter shaft having the inflating balloon and drainage eyes is inserted in the bladder via the urethra. Once in place, a sterile fluid is forced into the inflating lumen and inflatable balloon. Generally 5 to 30 cubic centimeters of fluid is used. This fluid inflates the balloon and the balloon prevents the catheter from being displaced from the bladder until it is deflated.

SUMMARY OF THE INVENTION

This invention concerns a method of making an inflatable balloon catheter. This method comprises a series of steps for attaching a one piece catheter tip to the distal end of a double lumen catheter shaft. The catheter tip has a balloon section and a drainage section. The inventive method uses a number of heat shrinkable sleeves in combination with an adhesive material to bond the tip to the catheter shaft at either end of the balloon section. In this manner the invention provides a method for bonding the catheter tip to the shaft at precise points on the catheter shaft. It also provides a method for forming a gradually tapering and generally smooth surface on the outer circumference of the catheter at the point where the catheter tip section overlies and is attached to the catheter shaft.

DESCRIPTION OF THE DRAWINGS

In the drawings:
FIG. 1 is a compressed elevational view of an inflatable balloon catheter;
FIG. 2 is an elevational view of the tip section of an inflatable balloon catheter with the balloon inflated;
FIG. 3 is a sectional view taken along line 3—3 of FIG. 1;
FIG. 4 is a partially cut away perspective view of the catheter tip section which is attached to the distal end of the catheter shaft;
FIG. 5 is a cross-sectional view of the catheter shaft taken along line 5—5 of FIG. 3;
FIG. 6 is a sectional view of an inflated catheter tip section;
FIG. 7 is an elevational view showing a first heat shrinkable sleeve (partially cut away) being placed on the distal end of the catheter shaft;
FIG. 8 is an elevational view showing the first sleeve after it is properly positioned and heat shrunk onto the catheter shaft;
FIG. 9 is an elevational view showing one method of placing the catheter tip on the catheter shaft;
FIG. 10 is an elevational view of the arrangement of FIG. 9 after the catheter tip section has been properly positioned and the balloon section has been unrolled;
FIG. 11 is a sectional view taken along line 11—11 of FIG. 10;
FIG. 12 is an elevational view of one method of removing the first heat shrinkable sleeve;
FIG. 13 is an elevational view of one method of applying adhesive to the proximal end of the balloon section of the tip after a second heat shrinkable sleeve has been positioned;
FIG. 14 is an elevational view of the catheter of FIG. 13 with a third heat shrinkable sleeve in place;
FIG. 15 is an elevational view of the last step of the inventive method, the removal of the second and third heat shrinkable sleeves;
FIG. 16 is a perspective view of an alternative form of catheter tip; and
FIG. 17 is a sectional view of the alternative catheter tip of FIG. 16 in place on a catheter shaft.

DESCRIPTION OF THE INVENTION

The method of making an inflatable balloon catheter as taught by this invention comprises a series of process steps for attaching a catheter tip to the distal end of a double lumen catheter shaft. The catheter tip comprises a drainage section and an inflatable balloon section.

This invention teaches a method of precisely attaching a one piece flexible catheter tip to predetermined points on a catheter shaft while maintaining a gradually tapering and generally smooth surface at the point where the proximal end of the tip overlies the shaft.

The preferred material for the catheter parts, namely, the catheter shaft, the Y at the proximal end of the shaft, and the tip, is silicone rubber. Its flexibility, availability in varying degrees of softness, and chemical inertness make it most desirable as a material for catheters being inserted in the human body. It has been found for example that particular silicone formulations will have excellent elongation, durometer, modulus and other physical properties that are particularly well suited for making the tip sections of Foley catheters. These silicone formulations, when used to make catheter balloons and tip sections, can retain as much as 30 cubic centimeters of fluid without bursting.

Turning now to the drawings, the method of this invention will be more particularly described.

FIG. 1 shows a catheter 10 having a shaft 11 with a proximal portion 12 and distal portion 14. Attached to the proximal end 12 of shaft 11 is a draining and inflating means 16 in the form of a Y.

Drainage arm 18 of Y 16 is in communication with the drainage lumen or passageway 38 (see FIG. 3) in shaft 11. It can be fitted with a suitable drainage adaptor (shown at 20 in dotted lines) for removing or collecting the material passing through the drainage lumen of the catheter.

Inflating arm 22 of Y 16 is in communication with inflating lumen or passageway 34 (see FIG. 3). Arm 22 is fitted with a self-sealing valve 23 which can accept an inflating means shown generally at 24. Inflating means 24 may be a needle, syringe or the like.

Inflating passageway 34 is in communication with inflating port 36. In order that fluids pushed under pressure into inflating lumen 34 will pass through port 36 the inflating lumen either ends distally of the port or is otherwise blocked by plugging it with some suitable material, such as adhesive or sealant 41 in FIG. 3.

When a fluid is injected into inflating lumen 34 it will pass through port 36 and inflate balloon section 28 of catheter tip 26. An inflated ballon section 28 is shown in FIG. 2.

When inserted in a human bladder and inflated, urine in the bladder will pass through drainage eyes 32 of drainage section 30 and into drainage lumen 38 for collecting or removal through arm 18 and some suitable fitting such as shown at 20 in FIG. 1.

Drainage eyes 32 may be staggered as shown in FIGS. 1, 2 and 3 or arranged directly opposite one another.

FIG. 5 shows a cross section of a double lumen catheter shaft. Shaft 11 has an inflating lumen or passageway 34 and drainage lumen or passageway 38. Inflating lumen 34 can be seen in communication with inflating port 36.

FIGS. 2 and 6 show an inflated ballon section 28 of a catheter tip 26 when attached to shaft 11 as taught by this invention. The arrows in FIG. 6 simulate the fluid flowing out of inflating port 36 to inflate ballon section 28.

FIG. 4 shows a one piece catheter tip 26 having a balloon section 28 and drainage section 30 meeting at a point 40. The arrows in FIG. 4 indicate the direction of fluid or drainage flow through the tip. FIG. 16 shows an alternative form, 26a, of a one piece catheter tip. The balloon section of a catheter tip is preferably made of a thin layer of silicone rubber which has properties of elongation, modulus and durometer sufficient to insure that the balloon section will not burst or leak when inflated and will return, after being deflated, to a shape similar to its preinflation shape.

The method of making an inflatable balloon catheter like that at 10 in FIG. 1, using tip 26 of FIG. 4, begins with the step illustrated in FIG. 7. As seen in FIG. 7, a first heat shrinkable sleeve 42 is shown just prior to being slid around distal end 14 of catheter shaft 11 to cover a portion of the shaft 11. The sleeve is advanced along the shaft 11 to a point adjacent to but spaced from the distal end of shaft 11. As shown in FIG. 8 this provides an exposed portion 44 between the sleeve 42 and the distal end 46 of shaft 11. It is preferable that sleeve 42 be long enough to cover inflating port 36 to prevent any adhesive from getting into or covering the port.

This exposed portion 44 should be of sufficient length to allow room for enough adhesive to be applied (see FIG. 9) to the exposed portion 44 and distal end 46 of the shaft 11 to securely bond the tip 26 to the shaft. In practice it has been found that if exposed portion 44 is 3/32 to 1/8 of an inch a sufficient bonding area is provided. Exposed portion 44 could however be as large as 1/4 of an inch.

First sleeve 42 functions to provide a precise exposure of shaft 11 as at 44. This assures that catheter tip section 26 will be bonded to the shaft 11 at a predetermined point and distance on shaft 11. This point and distance on shaft 11. This point and distance are important because they determine how much of the balloon section 28 of the tip 26 will be bonded to the shaft 11 and how much will not be bonded to the shaft. The unbonded portion will serve as the inflatable portion of the balloon. Therefore if too great a length of the balloon section is bonded to the shaft the extent of possible balloon inflation will be reduced. For example if it is predetermined that 3/32 of an inch of the proximal and distal sections of the balloon section should be bonded to the shaft to make a 5 cc. balloon catheter, and more than 3/32 of an inch of the balloon section is bonded to the shaft, the balloon capacity will be less than 5 cc. Depending on how much less capacity is provided, this could cause serious problems in the use of the catheter. For example if the balloon capacity was reduced to 3 cc. but 5 cc. of fluid was injected into the balloon, the chances of balloon rupture or leakage would be greatly increased.

In addition to allowing a predetermined portion of the shaft to be exposed, first sleeve 42 also functions to prevent adhesive applied to exposed portion 44 of the shaft from contacting port 36 or any other portion of the shaft which will be covered by the tip section. Adhesive applied along the shaft in areas proximal to exposed portion 44 could result in the balloon section being bonded to these portions. This could cause the balloon to improperly inflate or in certain cases it might completely prevent inflation.

First sleeve 42 also prevents adhesive from entering and thereby plugging inflating port 36 or inflating lumen 34.

After the first heat shrinkable sleeve 42 has been positioned around the shaft 11 it is heated to a temperature in excess of its shrinking temperature to cause it to snugly shrink around shaft 11. The sleeve 42, after shrinking, is shown in FIG. 8.

The heating of sleeve 42 can be accomplished using any suitable heat source. One technique found acceptable is to use a circular resistance coil heater capable of maintaining a temperature within the coil of 500 to 800° F. By passing the shaft and sleeve through the heating area for varying lengths of time the desired amount of shrinkage can be attained.

Sleeve 42 and sleeves 50 and 54 discussed later can be made of any suitable heat shrinkable material. Good results have been obtained using a 0.004 inch thick sleeve of heat shrinkable polyvinyl chloride, commercially available as Grade 400, "Skin-Tight™" from Gilbreth Company, Philadelphia, Pa.

After first sleeve 42 has been shrunk around shaft 11 as shown in FIG. 8 the step illustrated in FIG. 9 is performed. This step is the application of adhesive 48 to the exposed portion 44 and preferably distal end 46 of shaft 11. This can be accomplished in any desired manner including dipping, brushing or the like. Whatever approach is used, care should be taken to prevent getting adhesive in the drainage lumen. One way to accomplish this is by applying the adhesive 48 in the following manner. The drainage lumen 38 of catheter shaft 11 is slid onto a pin which is slightly larger than the drainage lumen 38. At the base of the pin is a pool of the adhesive. The shaft is advanced down the pin until the adhesive is applied to distal end 46 and exposed portion 44 of shaft 11. The shaft is then removed from the pin and the interior of drainage lumen 38 is kept free of adhesive. The portion of the shaft proximal to the exposed portion 44 is protected from contact with adhesive 48 by sleeve 42.

The next step in the process is placing the catheter tip 26 in contact with the adhesive on shaft 11. This is preferably accomplished, as shown in FIG. 9, by rolling back the balloon section 28 of catheter tip 26 to the point 40 (see FIG. 3) where it meets the drainage section 30.

Point 40 of the tip is then butted against distal end 46 of shaft 11 and the adhesive 48 at distal end 46 of shaft 11. The rolled up balloon section 28 is then unrolled over the adhesive 48 on shaft 11 and at least a portion of the above sleeve 42. The end result of this step is shown in FIGS. 10 and 11.

An alternative way of accomplishing the result shown in FIG. 10 would be to place the catheter tip 26 in the position shown in FIG. 10 and then inject the adhesive 48 into the desired area, i.e. at the exposed portion 44 of shaft 11 by means of a needle, syringe or other suitable apparatus. Using this technique it would probably be difficult however to get adhesive between distal end 46 of shaft 11 and point 40 of the catheter tip 26 without also getting undesirable amounts of adhesive in the drainage lumen. This approach could be used however if adhesive was not required on distal end 46 of the shaft.

The next step in the method of this invention is to cure the adhesive 48. If a room temperature vulcanizing (RTV) silicone adhesive is used this can be done at ambient conditions or, in the case of "one part" RTV adhesives, the cure can be accelerated by curing it at temperatures in the range of 70 to 125° F. and relative humidity of 30 to 70%. A commercially available and acceptable RTV is "RTV 734" obtainable from Dow-Corning Corporation. "Two part" RTV adhesives are also available and could be used. They generally cure more rapidly than "one part" RTV adhesives, and without the necessity of heat and humidity to hasten cure. Examples of these are "RTV 615," "RTV 11," and "RTV 20," all commercially available from General Electric Company.

RTV or room temperature vulcanizing rubber adhesives are silicone fluids with silanol end groups. They can be made by depolymerizing linear polymethylsiloxane with water at 150–175° C. with KOH, ammonia or amines as catalysts.

A type of RTV found preferable for use with this invention is made by mixing a silicone fluid polymer with filler, crosslinking agent and curing catalyst and then protecting the mixture from moisture prior to use. Contact with air will bring about cure. The time required for cure depends upon the temperature, humidity and thickness of the silicone layer. A further discussion of RTV can be found in *Encyclopedia of Chemical Technology*, by Kirk and Othmer, Vol. 18, pages 244–246, 2nd Edition, 1969.

Any adhesive can be used in this invention which will bond together the materials of which the components, shaft and catheter tip, are made. Since it is preferred however to use silicone catheter components, silicone based or compatible adhesives have been discussed. Another suitable silicone based adhesive that could be used is an uncured, heat vulcanizable silicone compound.

The next step in the invention method is the removal of the first heat shrinkable sleeve 42. This is preferably done after the adhesive has completely cured. This step can be performed in many ways. An acceptable approach is shown in FIG. 12 where the balloon section 28 is rolled back to expose the sleeve 42 and it is slit along its length and then removed. The balloon section 28 can then be unrolled to its full length so that it surrounds the shaft 11 and covers inflating port 36.

FIG. 13 illustrates the next step in this method. A second heat shrinkable sleeve 50 is positioned to cover a portion of the proximal portion of the balloon section 28. The sleeve is located at a point adjacent to but spaced from the proximal end 29 of balloon section 28. The length of balloon section 28 or skirt 27 between the proximal end 29 of balloon section 28 and sleeve 50 is preferably about ⅛ of an inch. This length however can be from 1/16 to 3/16 of an inch.

Second sleeve 50 is then heated to shrink it into snug contact around balloon section 28 and shaft 11.

Adhesive 49 is then applied around the shaft 11 between the sleeve 50 and the proximal end 29 of balloon section 28 by any suitable means. A syringe, as generally depicted by 52 can be used. Other suitable techniques could also be used. The shrunken sleeve 50 prevents any adhesive 49 from going distally of it.

The second sleeve 50, the proximal end 29 of the balloon action 28, the skirt 27 and a portion of shaft 11 proximal to balloon end 29 are then covered and surrounded by a third heat shrinkable sleeve 54. Heat is then applied to the areas of the shaft surrounded by sleeve 54 in order to shrink it into a snug fit around the balloon section, adhesive 49 and sleeve 50 as shown in FIG. 14.

The shrinking of sleeve 54 causes some adhesive 49 to squeeze out from under the proximal end 29 of the balloon section 28 and onto shaft 11. Shrunken sleeve 54 thus causes a generally smooth, gradual taper to be formed at the proximal end 29 of balloon section 28 where it joins and is bonded to shaft 11. This generally smooth, gradual taper between the shaft and the proximal end 29 of balloon section 28 is shown generally at 56 of FIGS. 3 and 15.

The adhesive 39 is then cured. This bonds the proximal portion of balloon section 28 to the shaft 11. If a one part RTV is used, such as "RTV 732" available from Dow Corning Corporation, adhesive cure can be hastened by exposing the adhesive to temperatures of 70 to 125° F. and a relative humidity of 30 to 70%. The higher the temperature and percent humidity, the faster the cure.

The last step of the process, removal of sleeves 50 and 54, is shown in FIG. 15. This can be accomplished in any suitable manner. Since the sleeves are relatively thin plastic sheets or films any sharp instrument can be slid beneath them and used to cut them off the shaft.

As indicated above, an alternative form of catheter tip, 26a in FIG. 16, can be used in practicing the method of this invention. Catheter tip 26a differs from tip 26 of FIG. 4 in that the balloon section, 28a, and drainage section, 30a, of tip 26a do not meet at a point 40 as in FIG. 4. Rather the balloon and drainage sections of tip 26a comprise a continuous, thin silicone layer 28a and 30a extending distally to a more rigid head 31 at the end of tip 26a. Using this 26a catheter tip configuration a more rigid catheter tip is provided than that shown in FIG. 3. As seen in FIG. 17 the catheter shaft 11 extends almost the entire length of the catheter tip 26a and therefore causes the catheter tip to be more rigid and less flexible than the tip construction of FIG. 3. A less flexible catheter tip may be desirable in certain instances to aid in the insertion of the catheter.

Further rigidity can also be obtained with any of the catheter constructions disclosed herein by inserting a rigid stylet into the catheter during insertion in the body. The stylet would be removed after insertion was complete.

This same method is used in making the catheter of FIG. 3 or FIG. 17. The only difference would be that in attaching catheter tip 26a to the shaft 11 a larger portion 44 (see FIG. 8) of shaft 11 would be exposed in order to adhere (with adhesive 48) the drainage section 30a to the shaft 11. Whereas the exposed portion 44 generally ranges from 3/32 to ⅛ inch and can be as large a ¼ inch when using a catheter tip like 26 shown in FIG. 4, the exposed portion 44 would be about ½ inch for a 5 cc. catheter or 1 inch or more for a 30 cc. catheter using a catheter tip 26a, as shown in FIG. 17.

It is preferable when using a catheter tip like 26a to punch drainage holes 32a through the catheter tip and shaft 11 after the tip has been attached to the shaft in accordance with the method of this invention.

The above described method of making a catheter provides a catheter having a generally smooth surfaced, gently tapering tip section. This configuration has been shown to allow easy and relatively painless insertion, manipulation and removal of the catheter.

Modifications and variations within the scope of the following claims are intended to be included.

We claim:

1. A method of making an inflatable balloon catheter by attaching an inflatable balloon catheter tip to the distal end of a double lumen catheter shaft, the tip comprising a drainage section and a balloon section, said method comprising the steps of:
   (a) covering, with a first heat shrinkable sleeve, a portion of the shaft adjacent to but spaced from the distal end of the shaft, thereby leaving an exposed portion of the shaft at the distal end of the shaft;
   (b) heating the first sleeve to shrink it around the shaft;
   (c) applying a curable adhesive to said exposed portion of the shaft at the distal end of the shaft;
   (d) placing the distal portion of the balloon section of the tip in contact with the adhesive;
   (e) curing the adhesive in order to bond the distal portion of the balloon section of the tip to the shaft;
   (f) removing the first sleeve;
   (g) covering, with a second heat shrinkable sleeve, a portion of the proximal portion of the balloon section of the tip at a point adjacent to but spaced from the proximal end of the balloon section;
   (h) heating the second sleeve to shrink it around the balloon section and shaft;
   (i) applying a curable adhesive to the shaft between the second sleeve and the proximal end of the balloon section of the tip;
   (j) covering, with a third heat shrinkable sleeve, the second sleeve and the proximal end of the balloon section in contact with the adhesive applied in step (i);
   (k) heating the third sleeve to shrink it around the shaft and thereby form a smoothly tapering surface of balloon section, adhesive and shaft at the junction of the proximal portion of the balloon section of the tip and the shaft;
   (l) curing the adhesive applied in step (i) in order to bond the proximal portion of the balloon section of the tip to the shaft; and
   (m) removing the second and third sleeves.

2. The method of claim 1 wherein the catheter shaft and tip are made of silicone rubber and the adhesive is a room temperature vulcanizing silicone rubber adhesive.

3. The method of claim 1 wherein said first, second and third heat shrinkable sleeves are made of polyvinyl chloride capable of shrinking at temperatures of 500 to 800° F.

4. The method of claim 1 wherein the exposed portion of the shaft in step (a) is from 3/32 to 1/4 of an inch.

5. The method of claim 1 wherein the exposed portion of the shaft in step (a) is from 3/32 to 1 inch.

6. The method of claim 1 wherein in step (g) the distance between the second sleeve and the proximal end of the balloon section is 1/4 to 1/8 of an inch.

7. The method of claim 1 wherein the adhesive used in steps (c) and (i) is cured by subjecting it to an atmosphere of 70 to 125° F. and 30 to 70% relative humidity for a period of time sufficient to cure the adhesive.

8. The method of claim 1 wherein step (d) is performed prior to step (c).

9. A method of making an inflatable balloon silicone rubber catheter by attaching a silicone rubber inflatable balloon catheter tip to the distal end of a double lumen silicone rubber catheter shaft, the tip comprising a drainage section and a balloon section, said method comprising the steps of:
   (a) covering, with a first heat shrinkable sleeve, a portion of the shaft adjacent to but spaced from the distal end of the shaft, thereby leaving an exposed portion of the shaft at the distal end of the shaft;
   (b) heating the first sleeve to shrink it around the shaft;
   (c) applying a room temperature vulcanizing silicone adhesive to said exposed portion of the shaft at the distal end of the shaft;
   (d) placing the distal portion of the balloon section of the tip in contact with the adhesive;
   (e) curing the adhesive by subjecting it to an atmosphere of 70 to 125° F. and 30 to 80% relative humidity for a period of time sufficient to bond the distal portion of the balloon section of the tip to the shaft;
   (f) removing the first sleeve;
   (g) covering, with a second heat shrinkable sleeve, a portion of the proximal portion of the balloon section of the tip at a point adjacent to but spaced from the proximal end of the balloon section;
   (h) heating the second sleeve to shrink it around the balloon section and shaft;
   (i) applying a room temperature vulcanizing silicone adhesive to the shaft between the second sleeve and the proximal end of the balloon section of the tip;
   (j) covering, with a third heat shrinkable sleeve, the second sleeve and the proximal end of the balloon section in contact with the adhesive applied in step (i);
   (k) heating the third sleeve to shrink it around the shaft and thereby form a smoothly tapering surface of balloon section, adhesive and shaft at the junction of the proximal portion of the balloon section of the tip and the shaft;
   (l) curing the adhesive applied in step (i) by subjecting it to an atmosphere of 70 to 125° F. and 30 to 70% relative humidity for a period of time sufficient to bond the proximal portion of the balloon section of the tip to the shaft; and
   (m) removing the second and third sleeves.

References Cited
UNITED STATES PATENTS

| | | | |
|---|---|---|---|
| 2,308,484 | 1/1943 | Auzin et al. | 156—245 |
| 3,746,003 | 7/1973 | Blake et al. | 128—349 B |
| 3,625,793 | 12/1971 | Sheridan et al. | 128—349 B |
| 3,694,280 | 9/1972 | Hoef | 156—84 |
| 3,630,206 | 12/1971 | Gingold | 128—349 B |
| 3,716,433 | 2/1973 | Plummer | 156—85 |

CHARLES E. VAN HORN, Primary Examiner

F. FRISENDA, Jr., Assistant Examiner

U.S. Cl. X.R.

128—349 B, 349 BV; 156—247, 295, 303.1, 323, 344